(12) United States Patent
Kim et al.

(10) Patent No.: US 12,535,150 B2
(45) Date of Patent: Jan. 27, 2026

(54) FUEL GAS BLOCKING DEVICE DOUBLING AS FLOW PASSAGE

(71) Applicant: TK-FUJIKIN CORPORATION, Busan (KR)

(72) Inventors: Jae Kwang Kim, Busan (KR); Jae Uk Byeon, Busan (KR)

(73) Assignee: TK-FUJIKIN CORPORATION, Busan (KR)

( * ) Notice: Subject to any disclaimer, the term of this patent is extended or adjusted under 35 U.S.C. 154(b) by 108 days.

(21) Appl. No.: 18/534,878

(22) Filed: Dec. 11, 2023

(65) Prior Publication Data

US 2025/0164028 A1  May 22, 2025

(30) Foreign Application Priority Data

Nov. 16, 2023  (KR) .................. 10-2023-0158778

(51) Int. Cl.
| | | |
|---|---|---|
| *F16K 31/40* | (2006.01) | |
| *F16K 31/06* | (2006.01) | |
| *F16K 31/42* | (2006.01) | |
| *F17C 13/04* | (2006.01) | |

(Continued)

(52) U.S. Cl.
CPC ........ *F16K 31/408* (2013.01); *F16K 31/0651* (2013.01); *F16K 31/42* (2013.01); *F17C 13/04* (2013.01); *H01M 8/04104* (2013.01); *H01M 8/04201* (2013.01); *F16K 31/0658* (2013.01); *F16K 2200/30* (2021.08); *F17C 2205/0326* (2013.01); *H01M 2250/20* (2013.01)

(58) Field of Classification Search
USPC ................. 251/30.03–30.5, 129.21
See application file for complete search history.

(56) References Cited

U.S. PATENT DOCUMENTS 5,048,790 A * 9/1991 Wells .................... F16K 31/408
                                                         251/44
5,188,017 A * 2/1993 Grant .................... F17C 13/04
                                                         251/129.21

(Continued)

*Primary Examiner* — Matthew W Jellett
(74) *Attorney, Agent, or Firm* — LEX IP MEISTER, PLLC

(57) ABSTRACT

To improve durability and production economics, the present disclosure provides a fuel gas blocking device doubling as a flow passage, the device including a supply body part having a flow passage formed therein to supply a fuel gas and provided with a supply port having a sealing step formed therein on one side thereof, a solenoid body of which a front end is hermetically fastened to the supply port and a rear end extends rearward such that a coil part is provided on an outer side thereof, and in which a hollow is formed in a longitudinal direction, and a flow passage cover in which a first flow passage is formed in the longitudinal direction is provided at a rear end of the hollow, a flow passage plunger inserted into a front end of the hollow, selectively moving rearward when power is supplied to the coil part, and having a second flow passage formed therein in the longitudinal direction, a spring that is provided between the flow passage cover and the flow passage plunger and provides an elastic restoring force in a direction in which the flow passage plunger moves forward, and a gap poppet part that is provided at a front end of the flow passage plunger and selectively seals the sealing step when moving forward.

1 Claim, 3 Drawing Sheets

(51) Int. Cl.
    *H01M 8/04082*     (2016.01)
    *H01M 8/04089*     (2016.01)

(56) References Cited

U.S. PATENT DOCUMENTS

| | | | | |
|---|---|---|---|---|
| 5,899,194 | A * | 5/1999 | Iwatsuki | F02D 19/025 |
| | | | | 251/129.21 |
| 6,871,802 | B2 * | 3/2005 | Stilwell | F17C 13/04 |
| | | | | 251/282 |
| 6,994,308 | B1 * | 2/2006 | Wang | F16K 1/12 |
| | | | | 251/129.21 |
| 8,151,819 | B2 * | 4/2012 | Suzuki | F17C 13/04 |
| | | | | 137/320 |
| 8,382,063 | B2 * | 2/2013 | Watanabe | F16K 31/0655 |
| | | | | 335/277 |
| 11,619,319 | B2 * | 4/2023 | Beier | F16K 31/408 |
| | | | | 137/487.5 |
| 2009/0236551 | A1 * | 9/2009 | Nomichi | F17C 13/04 |
| | | | | 137/79 |
| 2015/0192213 | A1 * | 7/2015 | Nomichi | G05D 16/20 |
| | | | | 137/488 |
| 2024/0255109 | A1 * | 8/2024 | Rau | F16K 31/0606 |

* cited by examiner

FUEL GAS BLOCKING DEVICE DOUBLING AS FLOW PASSAGE

CROSS-REFERENCE TO RELATED APPLICATION

This application claims priority to and the benefit of Korean Patent Application No. 10-2023-0158778 filed on Nov. 16, 2023, the disclosure of which is incorporated herein by reference in its entirety.

BACKGROUND

1. Field of the Invention

The present disclosure relates to a fuel gas blocking device doubling as a flow passage, and more particularly, to a fuel gas blocking device doubling as a flow passage, which is lightweight and compact, and has improved durability and production economics.

2. Discussion of Related Art

In general, in fuel cell electric vehicles (FCEVs), electricity is electrochemically generated using oxygen and hydrogen in a stack, and chemical energy of a fuel is directly converted into electrical energy, and thus used as a power source.

FCEVs correspond to an environmental-friendly technology in which electricity is generated by supplying a fuel gas such as hydrogen from a fuel tank, thus efficiency is high, and almost no pollutants are emitted, and therefore many development attempts thereof are currently being conducted.

An FCEV includes a fuel supply unit that supplies the fuel gas such as the hydrogen to the stack. In this case, the fuel supply unit further includes various valve devices such as blocking valves, adjustment valves, and drain valves, various controllers, and electrical components in a line through which the fuel is supplied from the fuel tank via a high pressure regulator and a low pressure regulator.

FIG. 1 is view illustrating a fuel gas supply unit according to the related art.

As illustrated in FIG. 1, in a vehicle fuel cell supply unit according to the related art, a fuel gas blocking valve 2, an adjustment valve 3, a purge valve 4, and the like are sequentially connected to an upper portion of a metallic pipe body part 1 connected in series, and thus a volume and weight thereof increase.

Moreover, a plunger of a solenoid valve is installed inside the fuel gas blocking valve 2 to move vertically to electronically block a flow passage. Thus, a direction of the flow passage formed inside the pipe body part 1 and a movement direction of the plunger for opening or closing the flow passage are formed perpendicular to each other.

Therefore, the volume and weight of the pipe body part 1 are increased by a portion in which the fuel gas blocking valve 2 is installed. Further, since the flow passage and the plunger are arranged perpendicular to each other, a plurality of seals are required to seal the flow passage, and therefore, costs and material costs required for processing are high and production economics are degraded.

Further, a structural complexity and a size and weight of the device increase because a partition wall for fuel blocking sealing should be separately formed on the flow passage in order to prevent leakage of a high-pressure hydrogen fuel gas at an end of the plunger. Thus, it is difficult to apply the present disclosure to flying vehicles such as drones.

In addition, since a direction of the flow passage formed inside the pipe body part 1 and a movement direction of the plunger for opening or closing the flow passage are perpendicular to each other, it is difficult to absorb an opening and closing impact caused by a high pressure difference in a process of opening or closing a high-pressure hydrogen fuel gas. Accordingly, the durability of the fuel gas blocking valve is degraded, and it is difficult to maintain the sealing performance when the device is used for a long time.

SUMMARY OF THE INVENTION

The present disclosure is directed to providing a fuel gas blocking device doubling as a flow passage, which is lightweight and compact and has improved durability and production economics.

A fuel gas blocking device doubling as a flow passage includes a supply body part having a flow passage formed therein to supply a fuel gas and provided with a supply port having a sealing step formed therein on one side thereof, a solenoid body of which a front end is hermetically fastened to the supply port and a rear end extends rearward such that a coil part is provided on an outer side thereof, and in which a hollow is formed in a longitudinal direction, and a flow passage cover in which a first flow passage is formed in the longitudinal direction is provided at a rear end of the hollow, a flow passage plunger inserted into a front end of the hollow, selectively moving rearward when power is supplied to the coil part, and having a second flow passage formed therein in the longitudinal direction, a spring that is provided between the flow passage cover and the flow passage plunger and provides an elastic restoring force in a direction in which the flow passage plunger moves forward, and a gap poppet part that is provided at a front end of the flow passage plunger and selectively seals the sealing step when moving forward.

A stopping pin may fixedly protrude from an outer surface of the front end of the flow passage plunger, and the stopping pin may be stopped by and coupled to an inner circumference of the gap poppet part, and a gap groove having a preset gap distance in a front-rear direction may be formed in the inner circumference of the gap poppet part.

A differential pressure adjustment hole may be formed at a center of the gap poppet part, and an auxiliary poppet that selectively seals the differential pressure adjustment hole may protrude from the front end of the flow passage plunger.

A radiation flow passage may be formed to pass through a front end of the second flow passage of the flow passage plunger.

Spring steps between which the spring is interposed may be formed at a front end of the flow passage cover and a rear end of the flow passage plunger.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a fuel gas blocking device doubling as a flow passage according to embodiments of the present disclosure will be described in detail with reference to the accompanying drawings.

The present disclosure provides a fuel gas blocking device doubling as a flow passage, which prevents leakage of a hydrogen fuel even while compact and is small and lightweight such that the fuel gas blocking device is suitable for use in a flight vehicle.

Figure 1:
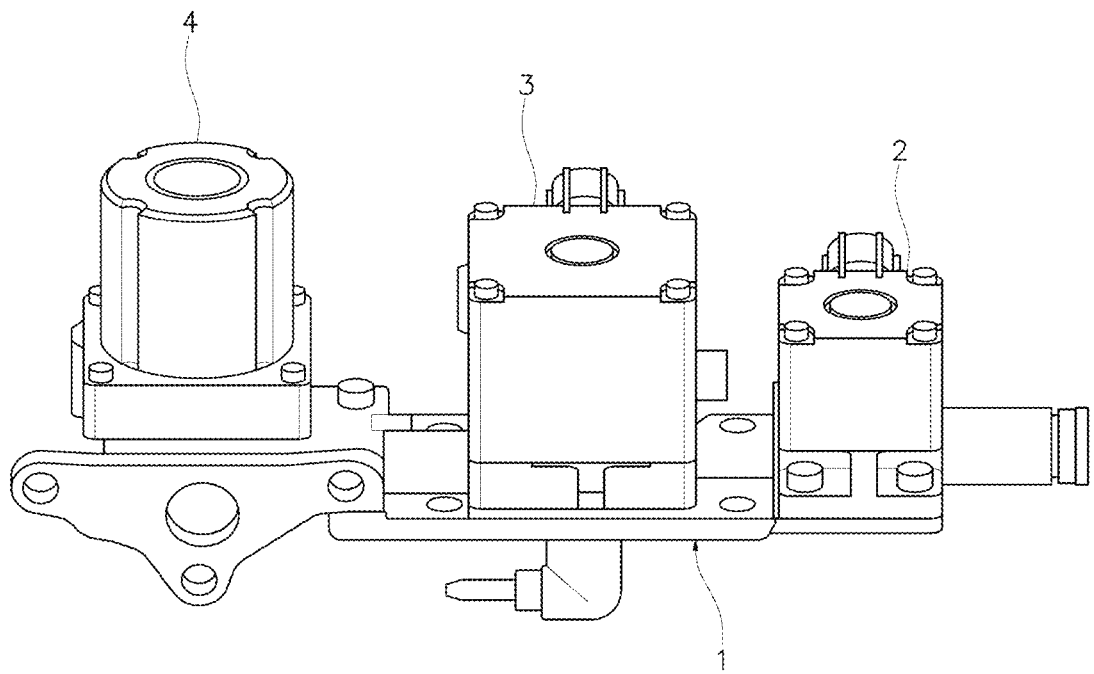
FIG. 1 is a view illustrating a fuel gas supply unit according to the related art.
Figure 2:
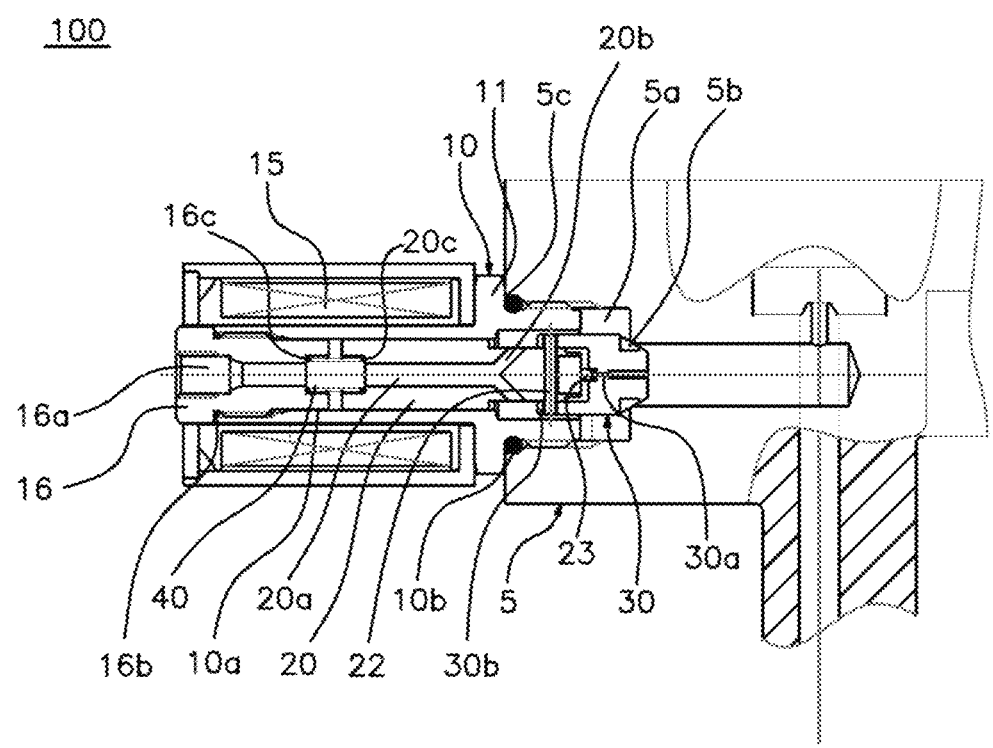
FIG. 2 is a cross-sectional view of a fuel gas blocking device doubling as a flow passage according to an embodiment of the present disclosure.
Figure 3:
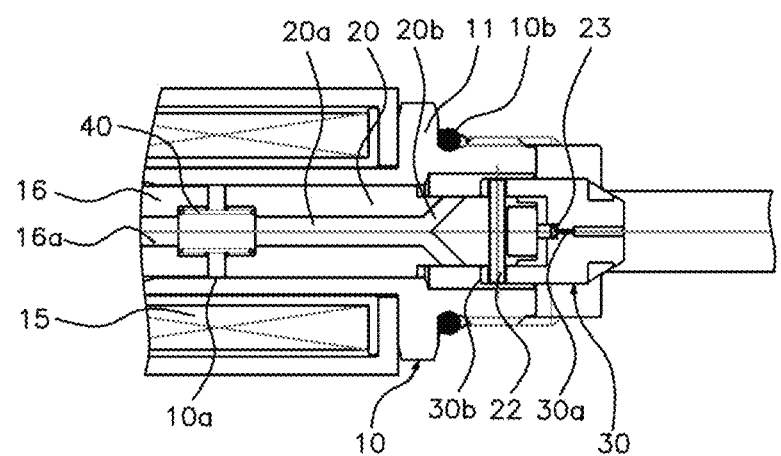
FIG. 3 is an enlarged cross-sectional view of a main part of the fuel gas blocking device doubling as a flow passage in a closed state according to the embodiment of the present disclosure.
Figure 4:
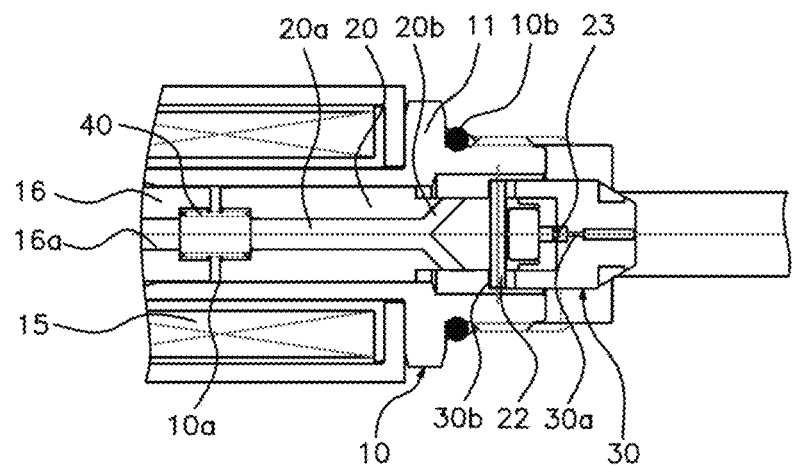
FIG. 4 is an enlarged cross-sectional view of the main part of the fuel gas blocking device doubling as a flow passage in a primary open state according to the embodiment of the present disclosure.
Figure 5:
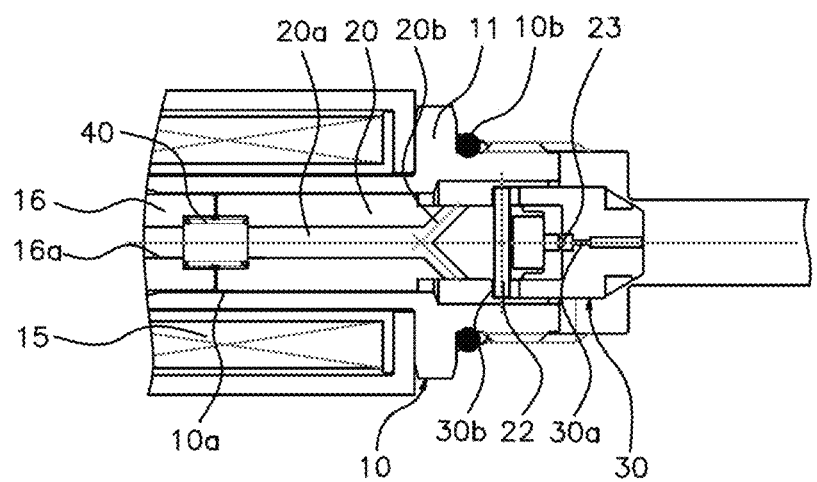
FIG. 5 is an enlarged cross-sectional view of the main part of the fuel gas blocking device doubling as a flow passage in a secondary open state according to the embodiment of the present disclosure.

FIG. 1 is a view illustrating a fuel gas supply unit according to the related art, FIG. 2 is a cross-sectional view of a fuel gas blocking device doubling as a flow passage according to an embodiment of the present disclosure, FIG. 3 is an enlarged cross-sectional view of a main part of the fuel gas blocking device doubling as a flow passage in a closed state according to the embodiment of the present disclosure, FIG. 4 is an enlarged cross-sectional view of the main part of the fuel gas blocking device doubling as a flow passage in a primary open state according to the embodiment of the present disclosure, and FIG. 5 is an enlarged cross-sectional view of the main part of the fuel gas blocking device doubling as a flow passage in a secondary open state according to the embodiment of the present disclosure.

As illustrated in FIGS. 1 to 5, a fuel gas blocking device 100 doubling as a flow passage according to the present disclosure includes a supply body part 5, a solenoid body 10, a flow passage plunger 20, a spring 40, and a gap poppet part 30.

Here, a flow passage for supplying a fuel gas to a stack is formed in the supply body part 5, and a supply port 5a in which a sealing step 5b is formed is provided on one side of the supply body part 5. The supply port 5a is connected to the flow passage for supplying a fuel gas to the stack.

Further, a front end of the solenoid body 10 is hermetically fastened to the supply port 5a. Here, the hermetic fastening is a fastening method in which components are fastened by mutual screw coupling or the like, a first sealing 10b is interposed between portions of a screw coupling part, which face each other, and thus leakage of the fuel gas is blocked. In this case, a flange part 11 protrudes from an outer surface of the solenoid body 10, and the first sealing 10b is provided in front of the flange part 11.

Thus, a thread formed on an outer circumference of the front end of the solenoid body 10 is screw-fastened to a female thread formed on an inner circumferential surface of the supply port 5a. In this fastening process, the first sealing 10b is maintained in a pressed state between the flange part 11 and a supply port edge 5c, thereby stably blocking the leakage.

Further, a rear end of the solenoid body 10 extends rearward such that a coil part 15 is provided on an outer surface thereof. Further, a hollow 10a is formed inside the solenoid body 10 in a longitudinal direction.

Here, a flow passage cover 16, in which a first flow passage 16a passes in the longitudinal direction, is hermetically fastened to a rear end of the hollow 10a. To this end, a second sealing 16b that blocks the leakage of the fuel gas may be interposed between the rear end of the hollow 10a and the solenoid body 10. Therefore, the hollow 10a inside the solenoid body 10 may be sealed and isolated from the outside by the first sealing 10b and the second sealing 16b.

Of course, the flow passage cover 16 may be formed as a separate component, or may be formed integrally with the solenoid body 10 and may have a first flow passage formed therein through a drilling and perforating process.

Meanwhile, the flow passage plunger 20 is inserted into a front end of the hollow 10a and is provided to selectively move rearward when power is supplied to the coil part 15, and a second flow passage 20a is formed inside the flow passage plunger 20 in the longitudinal direction.

Thus, a high-pressure fuel gas such as hydrogen supplied from a high-pressure fuel tank at a pressure of 700 bar or higher may be decompressed to 150 bar to 250 bar, may then flow into an inlet of the first flow passage 16a, and may flow to the front side through the second flow passage 20a communicating with the first flow passage 16a.

Further, the spring 40 is provided as a coil-type spring between the flow passage cover 16 and the flow passage plunger 20 and provides an elastic restoring force in a direction in which the flow passage plunger 20 moves forward. Thus, when power is supplied to the coil part 15, the flow passage plunger 20 moves rearward, and when the power supply is blocked, the flow passage plunger 20 moves forward with the elastic restoring force of the spring 40.

Here, it is preferable that spring steps 16c and 20c between which both ends of the spring 40 are stably interposed be formed at a front end of the flow passage cover 16 and a rear end of the flow passage plunger 20. Further, an opening or closing gap for forward and rearward movement of the flow passage plunger 20 is formed between the front end of the flow passage cover 16 and the rear end of the flow passage plunger 20.

Further, the gap poppet part 30 is connected to the front end of the flow passage plunger 20 to be movable forward or rearward by as much as a gap distance, which will be described below, and selectively seals the sealing step 5b when moving forward.

In detail, a radiation flow passage 20b is formed radially and laterally through a front end of the second flow passage 20a of the flow passage plunger 20. The fuel gas flowing through the second flow passage 20a flows out through the radiation flow passage 20b and flows forward through gaps between the flow passage plunger 20, the gap poppet part 30, and the solenoid body 10.

That is, the inflowing fuel gas may flow forward through the first flow passage 16a, a space between the springs 40, the second flow passage 20a, and the radiation flow passage 20b.

Further, a stopping pin 22 protrudes from and is fixed to an outer surface of a front end of the radiation flow passage 20b, and both ends of the stopping pin 22 protrude outward through an outer surface of the flow passage plunger 20. Further, a gap groove 30b by which the stopping pin 22 is stopped and coupled is formed on an inner circumference of the gap poppet part 30. The gap groove 30b is formed to have a free space or gap space in which the stopping pin 22 freely moves by a preset gap distance in a front-rear direction.

Therefore, in an initial process in which power is supplied to the coil part 15 and the flow passage plunger 20 moves rearward, the gap poppet part 30 is maintained in contact with the sealing step 5b, and when the stopping pin 22 is stopped by a rear end of the gap groove 30b, the flow passage plunger 20 may be finally stopped and moved rearward together with the gap poppet part 30.

In this case, the gap distance is smaller than an opening or closing gap formed between the front end of the flow passage cover 16 and the rear end of the flow passage plunger 20 in a closed state.

Here, a differential pressure adjustment hole 30a having a very narrow and fine cross-sectional area of 1 mm or less in diameter is formed at a center of a front side of the gap poppet part 30. Further, an auxiliary poppet 23, which selectively seals the differential pressure adjustment hole 30a when the flow passage plunger 20 moves forward by as much as the gap distance, protrudes from the front end of the flow passage plunger 20.

An operation process of the fuel gas blocking device 100 doubling as a flow passage will be described below.

FIG. 3 is an enlarged cross-sectional view of a main part of the fuel gas blocking device doubling as a flow passage in a closed state according to the embodiment of the present disclosure.

Referring to FIG. 3, in a state in which the power to the coil part 15 is cut off, the flow passage plunger 20 moves forward due to the elastic restoring force of the spring 40, presses the gap poppet part 30, and seals a flow passage on the sealing step 5b side. In this case, the auxiliary poppet 23 maintains a state of pressing and sealing an edge of the differential pressure adjustment hole 30a. Therefore, the supply of the fuel gas through the supply port 5a is blocked.

FIG. 4 is an enlarged cross-sectional view of the main part of the fuel gas blocking device doubling as a flow passage in a primary open state according to the embodiment of the present disclosure.

Referring to FIG. 4, when the power is supplied to the coil part 15, the flow passage plunger 20 starts to move rearward. In this way, in an initial time in which the flow passage plunger 20 moves rearward, while the stopping pin 22 is moved by the gap distance of the gap groove 30b, the gap poppet part 30 is maintained in contact with the sealing step 5b in a sealed state. On the other hand, the auxiliary poppet 23 integrally provided at the front end of the flow passage plunger 20 moves rearward to open the narrowed differential pressure adjustment hole 30a.

In this way, before the gap poppet part 30 completely opens the supply port, the differential pressure adjustment hole 30a that is formed as a minute penetration is primarily opened, and thus the pressure inside the supply port 5a may increase in advance. Therefore, the durability of the device can be improved by preventing damage to components due to opening or closing vibrations and pressure impacts caused by rapid opening due to a large pressure difference between front and rear sides of the sealing step 5b.

FIG. 5 is an enlarged cross-sectional view of the main part of the fuel gas blocking device doubling as a flow passage in a secondary open state according to the embodiment of the present disclosure.

Referring to FIG. 5, in a state in which the power is supplied to the coil part 15, when the flow passage plunger 20 continuously moves rearward, the stopping pin 22 is stopped by the rear end of the gap groove 30b. Therefore, while the flow passage plunger 20 and the gap poppet part 30 move rearward together, a front surface of the gap poppet part 30 is separated from the sealing step 5b, and thus the supply port 5a may be secondarily and completely opened.

In this case, the fuel gas may pass through the first flow passage 16a, the second flow passage 20a, and the radiation flow passage 20b and may be supplied to a fuel cell stack through the supply port 5a.

In this way, the fuel gas blocking device 100 doubling as a flow passage is fastened in the same direction as a flow passage forming direction of the supply port 5a.

Thus, the first flow passage 16a and the second flow passage 20a formed inside the fuel gas blocking device 100 doubling as a flow passage are formed in the same direction as the flow passage forming direction of the supply port 5a. Further, the flow passage forming direction and a movement direction of the gap poppet part 30 for sealing are formed on the same straight line and are opened or closed in series. Therefore, by simplifying the sealing structure of the device, a volume and weight thereof can be reduced so that the device may be applied to a flight vehicle, and sealing performance and production economics can be improved.

The present disclosure provides the following effects.

First, the first flow passage and the second flow passage formed inside the fuel gas blocking device doubling as a flow passage are opened or closed in series such that a flow passage forming direction of the supply port and a movement direction of the gap poppet part are formed on the same straight line. Therefore, by simplifying a sealing structure of the fuel gas blocking device doubling as a flow passage, a volume and weight thereof can be reduced so that the device may be applied to a flight vehicle such as a drone, and sealing performance and production economics can be significantly improved.

Second, before the gap poppet part completely opens the supply port, the differential pressure adjustment that is formed as a minute penetration is first opened, and thus a pressure inside the supply port can increase in advance. Therefore, the durability of the device can be improved by preventing damage to components due to opening or closing vibrations and pressure impacts caused by rapid opening due to a sharp pressure difference between front and rear sides of the sealing step.

As described above, the present disclosure is not limited to the above-described embodiments, modifications can be made by those skilled in the art to which the present disclosure pertains without departing from the range of the present disclosure claimed by the appended claims, and the modifications belong to the scope of the present disclosure.

What is claimed is:

1. A fuel gas blocking device, comprising:
    a supply body part having a flow passage formed therein to supply a fuel gas and provided with a supply port having a sealing step formed therein on one side thereof;
    a solenoid body of which a front end is hermetically fastened to the supply port and a rear end extends rearward such that a coil part is provided on an outer side thereof, and in which a hollow is formed in a longitudinal direction, and a flow passage cover in which a first flow passage is formed in the longitudinal direction is provided at a rear end of the hollow;
    a flow passage plunger inserted into a front end of the hollow, selectively moving rearward when power is supplied to the coil part, and having a second flow passage formed therein in the longitudinal direction;
    a spring provided between the flow passage cover and the flow passage plunger and configured to provide an elastic restoring force in a direction in which the flow passage plunger moves forward;

a gap poppet part provided at a front end of the flow passage plunger and configured to selectively seal the sealing step when moving forward;

an auxiliary poppet protruding from the front end of the flow passage plunger; and, a stopping pin fixedly protruding from an outer surface of the front end of the flow passage plunger, wherein the stopping pin is stopped by and coupled to a gap groove formed in an inner circumference of the gap poppet part, the gap groove having a preset gap distance in a front-rear direction, wherein the preset gap distance of the gap groove is greater than a thickness of the stopping pin in the front-rear direction, thereby the stopping pin being movable within the gap groove in the front-rear direction, wherein a differential pressure adjustment hole is formed at a center of the gap poppet part, wherein the auxiliary poppet is configured to selectively seal the differential pressure adjustment hole, wherein the flow passage plunger is formed as a single integrated body and has a radiation flow passage extended from a front end of the second flow passage of the flow passage plunger in radial direction, and wherein spring steps between which the spring is interposed are formed at a front end of the flow passage cover and a rear end of the flow passage plunger.

* * * * *